3,069,430
p-BENZOQUINONE - MONOGUANYLHYDRAZONE-
MONO-[4-HYDROXY-THIAZOLYL - (2)] - HYDRA-
ZONE AND PROCESS
Carl-Wolfgang Schellhammer and Siegfried Petersen, Leverkusen-Bayerwerk, and Gerhard Domagk, Wuppertal-Elberfeld, Germany assignors to Farbenfabriken Bayer Aktiengesellschaft, Leverkusen, Germany, a corporation of Germany
No Drawing. Filed Aug. 24, 1959, Ser. No. 835,413
Claims priority, application Germany Dec. 11, 1958
2 Claims. (Cl. 260—306.8)

This invention relates to quinone condensation products. This invention, more particularly, relates to and has as its object p-bezoquinone-monoguanylhydrazone-mono-[4-hydroxy-thiazolyl-(2)]-hydrazones formed by the condensation of a p-benzoquinone-monoguanylhydrazone-monothiosemicarbazone with an α-halo fatty acid, which compounds have been found to constitute highly valuable pharmaceutical products.

p-Benzoquinone-monoguanylhydrazone - monothiosemicarbazones, which may be substituted by alkyl groups on the amino group of the guanyl radical, are known to have excellent bacteriostatic and bactericidal properties, being active, for example, against streptococci, enterococci and other pathogens of infectious diseases. The use of these compounds is restricted only by their relatively poor tolerability.

An object of the instant invention is the preparation of compounds which are as effective, but which can be better tolerated than the known quinone condensation products.

The compounds in accordance with the invention are p-quinone condensation products having the general formula

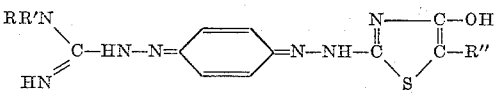

in which R represents hydrogen or a lower alkyl radical containing up to 4 carbon atoms, R' is hydrogen or a lower alkyl radical containing up to 4 carbon atoms and R" is hydrogen, a lower alkyl radical containing up to 3 carbon atoms, a carboxyl or carbalkoxy group.

It has been found that these new compounds are better tolerated and substantially of equal effectiveness as compared to the known derivatives of p-benzoquinone-monoguanylhydrazone-monothiosemicarbazones.

The new p-benzoquinone-monoguanylhydrazone-mono-thiosemicarbazone derivatives are obtained by condensing a p-benzoquinone-monoguanylhydrazone - monothiosemicarbazone with α-halo-fatty acids, which may be substituted, or with their salts or esters. The condensation may be represented as follows:

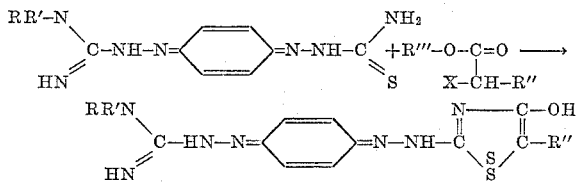

In these formulas R represents hydrogen or an alkyl radical having up to 4-carbon atoms; R' is hydrogen or an alkyl radical having up to 4 carbon atoms; R" is hydrogen, an alkyl radical with up to 3 carbon atoms, a carboxyl or carbalkoxy group; R''' is hydrogen, a cation, methyl or ethyl group; and X is chlorine or bromine.

The derivatives of 4-hydroxythiazole, which results as stated above, may be substituted.

The condensation reaction may be effected in an aqueous, aqueous-alcoholic or alcoholic solution. It is also possible, however, to use other organic solvents, such as dimethyl formamide, dimethyl sulfoxide, etc. The reaction may be effected at a temperature ranging between about room temperature and the boiling point of the solvent.

An alternative method for preparing the p-benzoquinone-monoguanylhydrazone-mono-[4 - hydroxythiazolyl-(2)]-hydrazones in accordance with the invention consists in condensing the corresponding p-benzoquinone-monoguanylhydrazone with a 2-hydrazino-4-hydroxythiazole, which may be substituted in the 5-position with an alkyl, carboxyl or carbalkoxy group. The condensation may be effected in aqueous, aqueous-alcoholic or alcoholic solution. It is also possible, however, to use other solvents, such as dimethylformamide, dimethyl sulfoxide or mixtures of these with water. The reaction may be effected at a temperature ranging between about room temperature and the boiling point of the solvent. The reaction may be effected with the addition of an acid catalyst, such as a mineral acid. Nitric acid has proven particularly suitable for this purpose.

The new condensation products are for the most part obtained as salts of mineral acids, as for example nitrates. The free bases may be separated from these salts by reaction with alkali, as for example ammonia. New salts may in turn be prepared from these bases by reaction with other acids. These compounds are characterized by their formation as small brown to bluish crystals.

The reaction of p-benzoquinone-monoguanylhydrazone-monothiosemicarbazone with α-chloroacetoacetic ester has been described previously (H. Beyer, W. Liebenow, and T. Pyl, B.90:1744 (1957).). The known condensation reaction, however, produces a p-benzoquinone-monoguanylhydrazone-mono-[4-methyl-5 - carbethoxythiazolyl-(2)]-hydrazone. When the α-chloroacetoacetic ester is used, as contrasted with the present condensation α-halofatty acid, its salt or ester, the β-carbonyl group and not the carboxylic ester grouping reacts besides the halogen atom, so that a thiazole rather than a 4-hydroxythiazole is formed. The known p-benzoquinone-monoguanylhydrazone-mono-[4-methyl-5-carboethoxythiazolyl-(2)]-hydrazone, which can also be prepared directly by condensation of p-benzoquinone-monoguanylhydrazone with [4-methyl-5-carbethoxy-thiazolyl-(2)]-hydrazine, also has a bacteriostatic action, but in contrast to the new compounds of the invention it is even more toxic than the starting material.

The better toleration of the new compounds, as compared to the previously known compounds, has been demonstrated by quantitative data on acute toxicity, as shown below:

A=p-benzoquinone-monoguanylhydrazone-monothiosemicarbazone (known, starting material)
B=p-benzoquinone-monoguanylhydrazone-mono-[4-methyl-5-carbethoxythiazolyl-(2)]-hydrazone (known)
C=p-benzoquinone-monoguanylhydrazone-mono-[4-hydroxythiazolyl-(2)]-hydrazone (application)

|  | A | B | C |
|---|---|---|---|
| Rat, orally | 0.75 | 0.05-0.01 | 1.0-2.5. |
| Rat, intraperitoneally. | 0.2 | 0.5 | 1.0-2.5. |
| Rabbit, orally | 0.1-0.3 | 0.25-0.5 | 1.0-2.5. |
| Cat, orally | 0.05 vomited | 0.05 vomited | 2.5 tolerated without vomiting. |

In the above table, the figures stand for grams per kg. of body weight.

The new compounds or their salts may find application as drugs in the form of pharmaceutical preparations, which contain them in mixtures with organic or inorganic, solid or liquid vehicles adapted to oral or parenteral administration, possibly with other pharmaceutical agents added. The compounds are administered in tablet form, but favorable effects have also been obtained with the compounds in spray or powder form. The compounds may be administered in their hydrated or their anhydrous form. The hydrate normally occurs upon recrystallization from a medium containing water, while the anhydrous base is obtained upon recrystallization from an anhydrous medium. They can be administered as the salts or free bases.

The quinone condensation products herein described represent new compounds with valuable bacteriostatic properties. The activity of these compounds against bacterial pathogens, particularly hemolytic streptococci of Group A, viridans streptococci, pneumococci and enterococci is particularly strong.

The following examples are given by way of illustration and not limitation:

*Example 1*

13 g. of p-benzoquinone-monoguanylhydrazone-monothiosemicarbazone is heated under reflux in 150 cc. of alcohol with 7 g. of ethyl chloroacetate for 8 hours. After cooling, a brownish-yellow material deposits. This is filtered off by vacuum, suspended in 200 cc. of water and mixed with excess ammonia. The liquor darkens and is filtered off by vacuum and recrystallized from a 3:1 dimethylformamide-water mixture. Obtained is 8 g. of a dark crystal powder containing 1 mol of water of crystallization. The water of crystallization can be removed by drying at temperatures above 100° C. The melting point of the p-benzoquinone-monoguanylhydrazone-mono-[4-hydroxythiazolyl-(2)]-hydrazone lies between 230 and 240° C. (decomposition) and depends greatly on the heating rate.

*Example 2*

1 g. of p-benzoquinone-monoguanylhydrazone is suspended in a mixture of 15 cc. alcohol, 5 cc. water and 0.5 cc. concentrated nitric acid and mixed with 1.5 g. of 4-hydroxy-thiazolyl-(2)-hydrazine. The mixture is heated on a water bath for 90 minutes. It is then allowed to cool, and the product is filtered off by vacuum and recrystallized from a 3:1 mixture of dimethylformamide and water. 0.5 g. of p-benzoquinone-monoguanylhydrazone-mono-[4-hydroxythiazolyl - (2) ] - hydrazone is obtained. Its properties agree with those of the material prepared according to Example 1.

*Example 3*

8.2 g. of p-benzoquinone-monoguanylhydrazone and 17 g. of acetone-[4-hydroxythiazolyl-(2)]-hydrazone are refluxed in a mixture of 150 cc. water and 150 cc. acetone and 6.3 cc. nitric acid (D 1.5) for one hour. On the next day the yellow nitrate which is formed is sucked off, suspended in 300 cc. water and rendered alkaline by the addition of ammonia. The crystals which separate are sucked off, dried at 60° C., dissolved in dimethyl formamide and filtered. Upon addition of water the p-benzoquinone-monoguanylhydrazone - mono - [4 - hydroxythiazolyl-(2)]-hydrazone separates from the filtrate. 10 g. of the dark crystals described in Example 1 are obtained which are dried in a vacuum at 90° C. Their melting point is 234° C. with decomposition.

The product was administered to humans in tablets containing 250 mg. of sulfadiazin and 25 mg. of p-benzoquinone-monoguanylhydrazone-mono - [4 - hydroxythiazolyl-(2)]-hydrazone. The tablets were given to patients suffering from rheumatic diseases with good success. A patient who had four times one tablet per day after each meal and who suffered from painful rheumatism could walk without pain after a short time of administration of the tablets. Even after taking an overall dose of 100 g. no side reactions were observed.

We claim:

1. p-Benzoquinone - monoguanylhydrazone - mono-[4-hydroxythiazolyl-(2)]-hydrazone.

2. Method for the preparation of p-benzoquinone-monoguanylhydrazone-mono-[4 - hydroxythiazolyl - (2)]-hydrazone, which comprises reacting p-benzoquinone-monoguanylhydrazone-monothiosemicarbazone with a compound having the formula

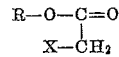

wherein R is a member selected from the group consisting of hydrogen, cations, methyl and ethyl groups and X is a member selected from the group consisting of chlorine and bromine, and recovering the p-benzoquinone-monoguanylhydrazone-mono-[4 - hydroxythiazolyl-(2)]-hydrazone.

References Cited in the file of this patent

UNITED STATES PATENTS

| | | |
|---|---|---|
| 2,780,630 | Kauer | Feb. 5, 1957 |
| 2,943,980 | Maffii et al. | July 5, 1960 |

FOREIGN PATENTS

| | | |
|---|---|---|
| 774,794 | Great Britain | May 5, 1957 |

OTHER REFERENCES

Chabrier et al.: Chem. Abstracts, vol. 41, col. 5510 (1947).

Chabrier et al.: Chem. Abstracts, vol. 45, col. 608 (1951).

Buu-Hoi et al.: Chem. Abstracts, vol 48, col. 673–4 (1954).

Buu-Hoi et al.: Chem. Abstracts, vol. 51, col. 4988 (1957).

Gheorgiu et al.: Chem. Abstracts, vol. 52, col. 17509 (1958).